(12) United States Patent
Cavelius et al.

(10) Patent No.: US 11,702,285 B2
(45) Date of Patent: Jul. 18, 2023

(54) STACKING STORAGE ARRANGEMENT

(71) Applicant: Jungheinrich Aktiengesellschaft, Hamburg (DE)

(72) Inventors: Jörg Cavelius, Bad Vilbel (DE); Michael Becker, Hainburg (DE); Markus Liebhaber, Oberursel (DE)

(73) Assignee: JUNGHEINRICH AKTIENGESELLSCHAFT, Hamburg (DE)

(*) Notice: Subject to any disclaimer, the term of this patent is extended or adjusted under 35 U.S.C. 154(b) by 376 days.

(21) Appl. No.: 17/027,423

(22) Filed: Sep. 21, 2020

(65) Prior Publication Data
US 2021/0122569 A1 Apr. 29, 2021

(30) Foreign Application Priority Data
Oct. 25, 2019 (EP) .................................. 19205238

(51) Int. Cl.
| | |
|---|---|
| *B65G 1/04* | (2006.01) |
| *B65G 1/06* | (2006.01) |
| *G05B 19/418* | (2006.01) |
| *G06Q 50/28* | (2012.01) |

(52) U.S. Cl.
CPC ........... *B65G 1/0471* (2013.01); *B65G 1/065* (2013.01); *G05B 19/41895* (2013.01); *G06Q 50/28* (2013.01)

(58) Field of Classification Search
CPC .... B65G 1/0471; B65G 1/065; B65G 1/0478; B65G 1/0485; B65G 157/203; B65G 1/0492; B65G 57/302; G06Q 50/28
See application file for complete search history.

(56) References Cited

U.S. PATENT DOCUMENTS

| | | | |
|---|---|---|---|
| 3,964,619 A * | 6/1976 | Irmler ..................... | B65G 1/10 221/124 |
| 5,156,514 A | 10/1992 | Zah | |
| 10,112,774 B2 | 10/2018 | Arnold et al. | |
| 10,202,239 B2 * | 2/2019 | Razumov ............. | B65G 1/0471 |
| 11,485,375 B2 * | 11/2022 | Austrheim ............ | B65G 57/03 |
| 2014/0056672 A1 * | 2/2014 | Mathys ................ | B65G 1/0407 414/277 |

(Continued)

FOREIGN PATENT DOCUMENTS

| | | | | |
|---|---|---|---|---|
| CN | 107203825 A | * | 9/2017 | ........... G05D 1/0217 |
| CN | 111741910 A | * | 10/2020 | ........... B65G 1/0407 |

(Continued)

OTHER PUBLICATIONS

European Search Report issued in European (EPO) Patent Application No. 19205238.9, dated Apr. 1, 2020.

*Primary Examiner* — Thomas Randazzo
(74) *Attorney, Agent, or Firm* — Greenblum & Bernstein, P.L.C.

(57) ABSTRACT

A stacking storage arrangement having multiple container receiving spaces that are arranged in multiple rows and columns, wherein a loading space in which at least one loading vehicle can be moved is arranged below the container receiving spaces. The operation of a stacking storage arrangement of this type is configured to be economical. For this purpose, a transverse transport device is provided with which the loading vehicle can be moved between positions that are respectively assigned to a row.

11 Claims, 2 Drawing Sheets

(56) References Cited

U.S. PATENT DOCUMENTS

| | | | |
|---|---|---|---|
| 2017/0270466 A1* | 9/2017 | Kao | G05D 1/0217 |
| 2019/0061446 A1* | 2/2019 | Fujihara | B60D 1/62 |
| 2019/0389671 A1* | 12/2019 | Cohen | B65G 47/90 |
| 2020/0216298 A1* | 7/2020 | Gravelle | B66F 9/063 |
| 2021/0198041 A1* | 7/2021 | Austrheim | B65G 1/0471 |
| 2021/0229917 A1* | 7/2021 | Austrheim | B65G 1/0471 |
| 2021/0269244 A1* | 9/2021 | Ahmann | B65G 1/0492 |

FOREIGN PATENT DOCUMENTS

| | | | |
|---|---|---|---|
| CN | 110603209 B * | 4/2021 | B65G 1/0407 |
| DE | 195 40 855 A1 | 5/1997 | |
| DE | 10 2012 02089 A1 | 4/2014 | |
| DE | 102013009340 A1 * | 12/2014 | B65G 1/0471 |
| EP | 0 458 021 A1 | 11/1991 | |
| EP | 1401743 B1 * | 9/2005 | B65G 1/0485 |
| EP | 3782930 A1 * | 2/2021 | B65D 85/62 |
| HU | 213074 B * | 2/1997 | B65G 1/0485 |
| JP | S60 71402 A | 4/1985 | |
| JP | 6-592711 B1 | 10/2019 | |
| JP | 6981876 B2 * | 12/2021 | B65G 1/04 |
| WO | 2016026910 A1 | 2/2016 | |
| WO | WO-2019154467 A1 * | 8/2019 | B65G 1/0464 |
| WO | WO-2020006010 A1 * | 1/2020 | B65G 1/0407 |

* cited by examiner

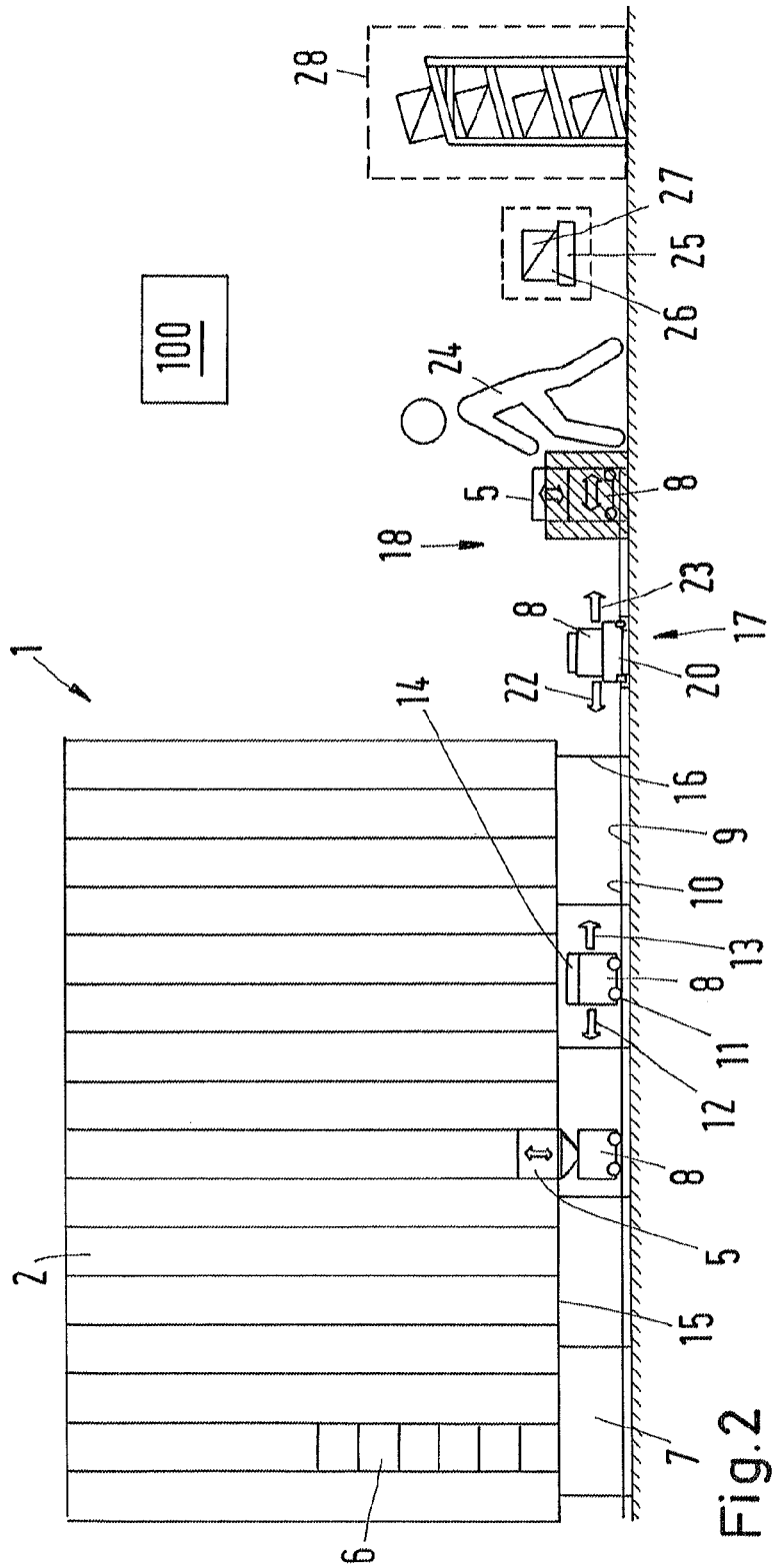
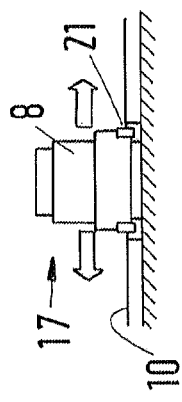
Fig. 2
Fig. 3

STACKING STORAGE ARRANGEMENT

CROSS-REFERENCE TO RELATED APPLICATIONS

The present application claims priority under 35 U.S.C. § 119 of European Patent Application No. EP 19205238.9, filed Oct. 25, 2019, the disclosure of which is expressly incorporated by reference herein in its entirety.

BACKGROUND

1. Field of the Invention

The present invention relates to a stacking storage arrangement having multiple container receiving spaces that are arranged in multiple rows and columns, wherein a loading space in which at least one loading vehicle can be moved is arranged below the container receiving spaces.

2. Discussion of Background Information

In a stacking storage arrangement, containers are respectively arranged in stacks. The stacks of containers are arranged in rows behind one another and in columns next to one another, so that the arrangement of the stacks is structured in the form of a matrix. One container receiving space each is provided to accommodate a stack of containers of this type.

If the container receiving spaces are loaded from below and the containers are also removed from the container receiving spaces again at the bottom, then a loading vehicle used for this purpose can be moved in the loading space that is arranged below the container receiving spaces. This has the advantage that the stacking storage arrangement does not also need to additionally accommodate the weight of one or more loading vehicles. The constructional cost for a stacking storage arrangement of this type can thus be kept low.

SUMMARY

The operation of the stacking storage arrangement of the invention is configured to be economical.

This is achieved with a stacking storage arrangement of the type described above in that a transverse transport device, or "transverse transport", is provided with which the loading vehicle can be moved between positions that are respectively assigned to a row.

As a result, containers can not only be transported within a row, but rather also between rows. The loading vehicle can thus remove a container from a container receiving space of a row, for example, then move it with the aid of the transverse transport device to a position that is assigned to another row, and subsequently place the container into storage in this other row. Accordingly, it is not necessary to assign a separate loading vehicle to each row, even though this is possible.

Preferably, the transverse transport device is arranged outside of the loading space. The transverse transport device then does not block access to a container receiving space. The space available for stacking the containers is thus utilized well.

Preferably, the transverse transport device comprises a first entry/exit access point for the loading vehicle, which first access point is directed towards the loading space, and a second entry/exit access point for the loading vehicle, which second access point is directed away from the loading space. Thus, not only can the loading vehicle be transported from one row to another row, the loading vehicle can also be made to drive away from the loading space, for example, in order to load it with a container or to remove the container, or to place products into storage in the container or remove products from the container.

Here, it is preferred that at least one placement-into-storage/removal-from-storage arrangement is arranged on the side of the transverse transport device facing away from the loading space. In a placement-into-storage/removal-from-storage arrangement, the partial or complete loading or unloading of the containers can be carried out.

Here, it is preferred that the number of placement-into-storage/removal-from-storage arrangements is less than the number of rows. In the placement-into-storage/removal-from-storage arrangement, an operator or an automatic handling machine, e.g., a robot, is in many cases necessary, which operator or machine performs the placement-into-storage of products in the container or the removal of products from the container. If it is desired that a plurality of products be kept in stock in the stacking storage arrangement and a correspondingly large number of containers are required therefor, it is possible that a large number of rows must be used in the stacking storage arrangement. As a result of the transverse transport device, the number of placement-into-storage/removal-from-storage arrangements can then nevertheless be limited in order to reduce costs.

Preferably, at least one placement-into-storage/removal-from-storage arrangement has at least one container transfer position for transferring a container from the placement-into-storage/removal-from-storage arrangement to the loading vehicle or vice versa. This creates increased safety for a user or an operator. Before the operator can reach into the container to remove a product or an article being stored in general, or to place the product into storage in the container, the container is removed from the loading vehicle. Only when it is no longer necessary for an operator to reach in is the container picked up by the loading vehicle or driven into the placement-into-storage/removal-from-storage arrangement by the loading vehicle.

It is also advantageous if the container transfer position comprises a tray beneath which an entry surface for the loading vehicle is arranged. The loading vehicle can then drive onto the entry surface and subsequently place the container on the tray. For this purpose, the loading vehicle can comprise a height-adjustable container seat, for example. If the container seat is lowered, then the container can be transferred to the tray. A height-adjustable container seat is advantageous in any case if the containers are intended to be introduced into the container receiving spaces from below.

Preferably, one transverse transport device each is arranged at each end of the rows. This allows a flexible control of the stacking storage arrangement to be achieved. If the transverse transport device at one end is occupied by a loading vehicle, another loading vehicle at the other end can be moved between the rows.

Preferably, the transverse transport device comprises a transverse transport trolley. The loading vehicle then only needs to be placed onto the transverse transport trolley in order to be moved between rows. This is a relatively simple solution.

Preferably, the transverse transport trolley can be moved on a first driving surface that is arranged lower in the direction of gravity than a second driving surface on which the loading vehicle can be moved in the loading space. In this case, the loading vehicle can be driven onto the transverse transport trolley in a level manner. The first driving surface and the second driving surface then do not interfere with one another.

Here, it is preferred that the first driving surface is embodied as a rail arrangement. With a rail arrangement, a reliable guidance of the transverse transport trolley can be achieved without a problem. The second driving surface can also be embodied as a rail arrangement in which the rails are attached to uprights that hold a holding device with which the container stacks are held in place above the loading space.

Preferably, a control device is provided that specifies a position of a container in the container receiving spaces as a function of a turnover frequency of the container. As already stated above, a container is used to accommodate products. In this process, there are products that are needed more frequently than other products. A container that contains frequently needed products has a higher turnover frequency than a container that contains products needed less often. Accordingly, the paths for the frequently used products can be kept short.

Preferably, the control device specifies the position of a container having a high turnover frequency in a lower region of a container receiving space. Because the loading and removal for a container receiving space take place from below, fewer steps are then required in order to access the container having the higher turnover frequency. This saves time and thus increases the economic efficiency during operation of the stacking storage arrangement.

It can also be provided that the control device specifies the position of a container having a high turnover frequency in a column that is closer to an end of a row than the position of a container having low turnover frequency. Accordingly, the loading vehicle must travel a shorter path if it is to reach a container having a high turnover frequency.

Advantageously, the control device determines the turnover frequency of containers dynamically during operation. In many cases, it is known which products are needed frequently. If this is not known from the outset, the control device can determine the turnover frequency of a container during operation, for example by counting the number of times the container is accessed. This can result in the containers being restacked over time, that is, in the position thereof being changed. However, such a change of positions can occur without significant effort during operation.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2 shows a schematic view of the stacking storage arrangement from FIG. 1 from the side, and FIG. 3 shows an enlarged schematic illustration of a transverse transport device.

DETAILED DESCRIPTION

Figure 1:
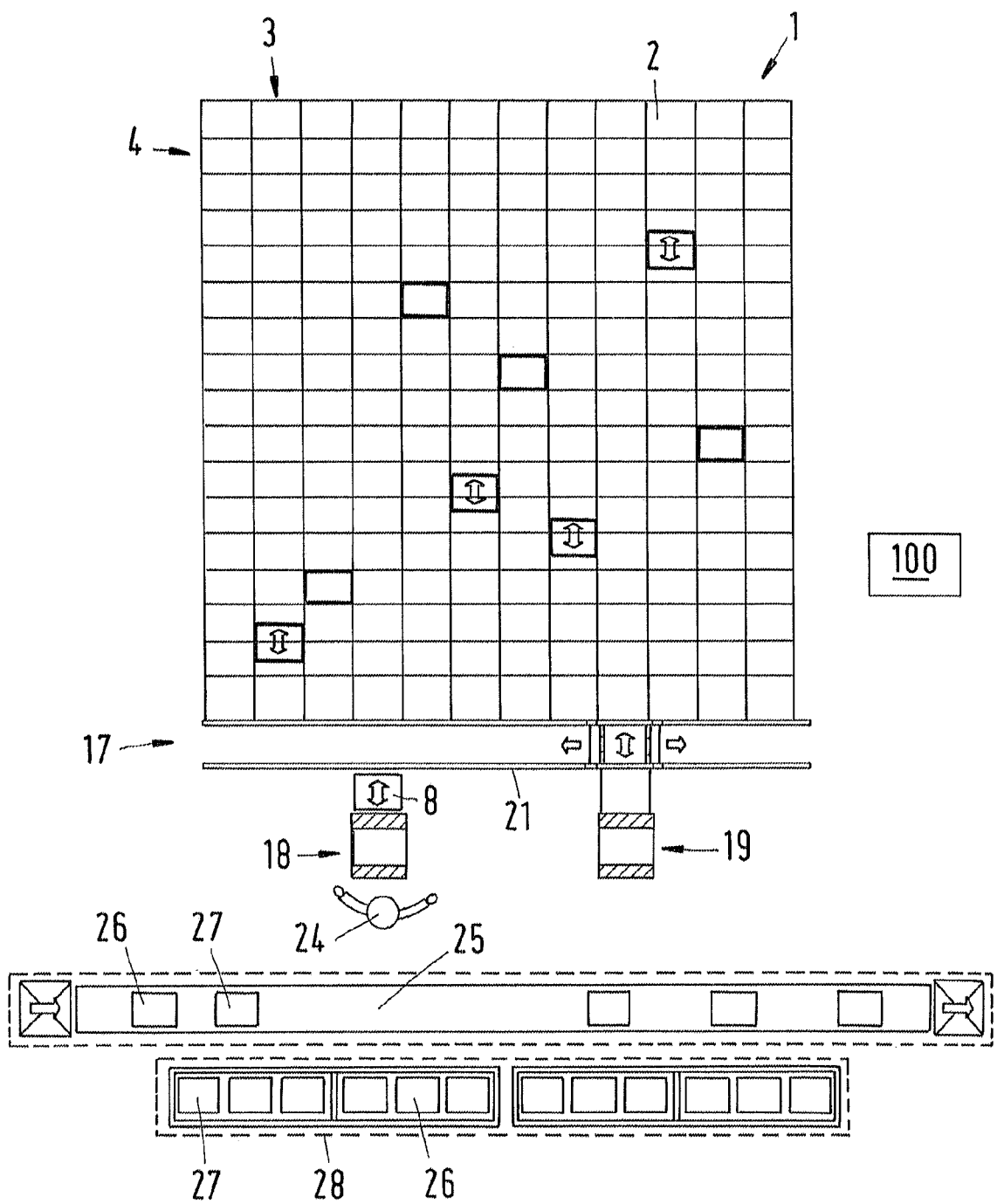
FIG. 1 shows a schematic illustration of a stacking storage arrangement in a top view.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 schematically shows a stacking storage arrangement 1 having multiple container receiving spaces 2 that are arranged in multiple rows 3 and multiple columns 4. Thus, in a top view, the container receiving spaces 2 are arranged in the form of a matrix with rows 3 and columns 4, wherein each container receiving space 2 is located at the intersection of a row 3 with a column 4. The rows 3 and the columns 4 do not necessarily all need to have the same length.

In each container receiving space 2, multiple containers 5 can be arranged on top of one another, namely in the form of a stack 6, as is illustrated in FIG. 2.

Below the container receiving spaces 2, a loading space 7 in which one or more loading vehicles 8 can be moved is arranged. The loading vehicles 8 can thereby be moved on a flooring 9 or, as illustrated, on a track 10 that is arranged on the flooring 9 or at a distance from the flooring 9. The track 10 can be embodied as a continuous surface. However, it can also be embodied as a rail arrangement on which wheels 11 of the loading vehicle 8 can roll.

The loading vehicle 8 can be moved in opposing directions, as is illustrated by arrows 12, 13. In the loading space 7, however, the loading vehicle 8 can only be moved in the direction of a row 3. The loading vehicle 8 can therefore solely be moved beneath container receiving spaces 2 of a row 3.

Within the row 3, the loading vehicle 8 can transport a container 5 from one column 4 to another column 4 in order to relocate a container.

A main purpose of the loading vehicle 8 is to introduce a container 5 into the stacking storage arrangement 1 or to remove a container 5 from the stacking storage arrangement 1.

For the introduction, the loading vehicle 8 transports the container 5 into a position beneath a container receiving space 2 and lifts the container 5. For this purpose, the loading vehicle 8 comprises a height-adjustable container seat 14. When the container 5 comes into contact with the stack 6, the stack 6 is lifted in tandem, and the container 5 is lifted further with the stack 6 until it has passed a holding device 15 with which the bottom container 5 is held at the necessary distance above the track 10. The holding device 15 is, for example, attached to uprights 16 which stand on the flooring 9.

For the removal of a container 5 from the stacking storage arrangement 1, the loading vehicle 8 is once again driven beneath the container receiving space 2 and the container seat 14 of the loading vehicle 8 is lifted until it comes into contact with the bottom container 5 of a stack 6. The container 5 is lifted with the stack 6. The holding device is 15 can then be released. The container 5 is lowered with the stack 6. The holding device 15 thereby engages with the, up to this point, second-from-the-bottom container of the stack 6, so that the remaining stack 6 is held in the container receiving space 2. The container 5 being removed can then be driven out of the stacking storage arrangement 1 with the loading vehicle 8.

A control device 100, or "controller", which can be connected to the loading vehicle 8 in a wireless manner or even via wires, controls the loading vehicle 8 such that it can perform the necessary tasks, that is, the placement into storage, removal from storage, or relocation of containers 5 in the respective row 3. Because the movement of the loading vehicle 8 is limited to driving back and forth within a row 3, the control device 100 can work with relatively simple algorithms.

To also enable a transport of a container 5 from one row to another or parallel to the columns 4 in general, a transverse transport device 17 is provided at at least one front face of the rows 3, with which transverse transport device 17 the loading vehicle 8 can be moved between positions that are respectively assigned to a row 3.

In addition, with the transverse transport device 17 it is possible to transport the loading vehicle 8 to positions that are respectively assigned to a placement-into-storage/removal-from-storage arrangement 18, 19. A position assigned to a placement-into-storage/removal-from-storage arrangement 18, 19 can coincide with a position assigned to a row 3. However, this is not mandatory.

The transverse transport device 17 comprises a transverse transport trolley 20 which can be moved on rails 21 that form a first driving surface. The track 10 forms a second driving surface. As can be seen in FIG. 3, the first driving surface, namely the rail 21, is arranged lower in the direction of gravity than the second driving surface, which is formed by the track 10. The loading vehicle 8 can thus be moved from the track 10 onto the rail arrangement 21 without a problem.

The transverse transport device 17 comprises a first entry/exit access point for the loading vehicle 8, which first access point is directed towards the loading space 7. Accordingly, the loading vehicle 8 can be moved away from the transverse transport trolley 20 in the direction of the arrow 22. The loading vehicle 8 can (opposite to the direction of the arrow 22) be moved onto the transverse transport trolley 20.

The transverse transport device 17 comprises a second entry/exit access point for the loading vehicle 8, which second access point is directed away from the loading space 7. This is illustrated by the arrow 23. Via the second entry/exit access point, the loading vehicle can reach the placement-into-storage/removal-from-storage arrangements 18, 19.

As can be seen in FIG. 1, the number of placement-into-storage/removal-from-storage arrangements 18, 19 is less than the number of rows 3.

FIG. 2 illustrates that an operator 24 has access to a container 5 that is arranged on a loading vehicle 8.

However, it can also be provided (not illustrated) that at least one placement-into-storage/removal-from-storage arrangement 18, 19 has at least one container transfer position for transferring a container from the placement-into-storage/removal-from-storage arrangement to the loading vehicle 8 or vice versa. For this purpose, the container transfer position expediently comprises a tray beneath which an entry surface for the loading vehicle 8 is arranged. If the loading vehicle 8 drives into the container transfer position, the container 5 can be lifted by the height-adjustable container seat 14. The loading vehicle 8 can then lower the container seat 14 and place the container on the tray. The loading vehicle 8 is free and can be used for further placement-into-storage or removal-from-storage operations or for relocation operations.

In FIG. 2, a single transverse transport device 17 is provided. However, a second transverse transport device 17 can also be arranged at the other end of the rows 3.

In each case, it is expedient if the transverse transport device 17 is arranged outside of the loading space 7. In this case, all container receiving spaces 2 are available for accommodating containers.

The control device 100 can then specify the position of a container 5 in the container receiving spaces 2 as a function of a turnover frequency of the container 5. A container 5 that is needed frequently is then expediently arranged in a lower region of container receiving space 2. The control device thus specifies the position of this container 5 in the lower region of a container receiving space 2.

If a container 5 of this type is needed, either no other container at all must be removed from the container receiving space 2 beforehand or a small number of containers must be removed from the container receiving space 2 before the desired container 5 is accessible.

It can also be provided that the control device 100 specifies the position of a container having a high turnover frequency in a column 4 that is closer to an end of a row 3 than the position of a container having low turnover frequency. The paths which the loading vehicle 8 must travel in order to reach the respective container receiving space 2 are then shorter.

In many cases, the turnover frequency of a container 5 is known. If this is not the case, then the control device 100 can determine the turnover frequency of containers 5 dynamically during operation, for example by counting how often a container is brought into the placement-into-storage/removal-from-storage arrangement 18, 19.

On the side of the placement-into-storage/removal-from-storage arrangements 18, 19 facing away from the loading space 7, a transfer element 25 can also be provided on which source containers 26 can be transported in, in which source containers 26 products or objects that are to be placed into storage in the containers 5 are located. Order containers 27 can also be transported in or transported away via the transfer element 25, into which order containers 27 objects or products that are removed from the container 5 can be introduced.

It is also possible to use a shelf arrangement 28 in which source containers 26 or order containers 27 can be kept ready.

The foregoing examples have been provided merely for the purpose of explanation and are in no way to be construed as limiting of the present invention. While the present invention has been described with reference to an exemplary embodiment, it is to be understood that the words that have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A stacking storage arrangement comprising:
   a structure defining multiple container receiving spaces arranged in multiple rows and columns and a loading space, each of the container receiving spaces being configured to form a stack of containers;

at least one loading vehicle configured to be movable into, and removable from, the loading space below the container receiving spaces;

a transverse transport configured to move the loading vehicle between positions that are respectively assigned to a row;

wherein the transverse transport is arranged outside of the loading space;

wherein the transverse transport comprises a first entry/exit access point for the loading vehicle, the first access point being directed towards the loading space, and a second entry/exit access point for the loading vehicle, the second access point being directed away from the loading space;

wherein at least one placement-into-storage/removal-from-storage arrangement is arranged on a side of the transverse transport facing away from the loading space; and wherein the placement-into-storage/removal-from-storage arrangement numbers less than that of the rows.

2. The stacking storage arrangement according to claim 1, wherein one transverse transport each is arranged at each end of the rows.

3. The stacking storage arrangement according to claim 1, wherein at least one placement-into-storage/removal-from-storage arrangement has at least one container transfer position for transferring a container from the placement-into-storage/removal-from-storage arrangement to the loading vehicle or vice versa.

4. The stacking storage arrangement according to claim 3, wherein the container transfer position comprises a tray beneath which an entry surface for the loading vehicle is arranged.

5. The stacking storage arrangement according to claim 1, wherein the transverse transport comprises a transverse transport trolley.

6. The stacking storage arrangement according to claim 5, wherein the transverse transport trolley is configured to be moved on a first driving surface that is arranged lower in a direction of gravity than a second driving surface on which the loading vehicle can be moved in the loading space.

7. The stacking storage arrangement according to claim 6, wherein the first driving surface is embodied as a rail arrangement.

8. The stacking storage arrangement according to claim 1, further comprising a controller configured to specify a position of a container in the container receiving spaces as a function of a turnover frequency of the container.

9. The stacking storage arrangement according to claim 8, wherein the controller is configured to specify a position of a container having a high turnover frequency in a lower region of a container receiving space.

10. The stacking storage arrangement according to claim 8, wherein the controller is configured to specify a position of a container having a high turnover frequency in a column that is closer to an end of a row than a position of a container having a low turnover frequency.

11. The stacking storage arrangement according to claim 8, wherein the controller is configured to determine the turnover frequency of containers dynamically during operation.

* * * * *